(12) United States Patent
Sanda

(10) Patent No.: US 6,874,396 B2
(45) Date of Patent: Apr. 5, 2005

(54) WEB PROCESSING SYSTEM

(75) Inventor: Akihiro Sanda, Minamiashigara (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/232,534

(22) Filed: Sep. 3, 2002

(65) Prior Publication Data

US 2003/0000360 A1 Jan. 2, 2003

Related U.S. Application Data

(62) Division of application No. 10/050,108, filed on Jan. 18, 2002, now Pat. No. 6,464,162, which is a division of application No. 09/417,119, filed on Oct. 13, 1999, now Pat. No. 6,357,691.

(30) Foreign Application Priority Data

Oct. 14, 1998 (JP) .......................................... 10-292426
Jan. 5, 1999 (JP) .......................................... 11-000375
Aug. 3, 1999 (JP) .......................................... 11-220028

(51) Int. Cl.$^7$ ............................................ B65H 35/02
(52) U.S. Cl. ...................... 83/102; 242/525.3; 226/176
(58) Field of Search .............................. 83/26, 72, 110, 83/102, 107, 156, 425.3; 226/34, 171, 176, 177; 242/525.3; 400/636.3; 271/273, 274, 272

(56) References Cited

U.S. PATENT DOCUMENTS 1,666,984 A * 1/1928 Willsea .......................... 83/89
2,258,428 A * 10/1941 Stalder .......................... 225/2

(Continued)

FOREIGN PATENT DOCUMENTS

| DE | 42 23 815 A1 | 1/1994 |
| DE | 43 35 313 A1 | 4/1995 |
| EP | 0 618 165 A2 | 10/1994 |
| EP | 0 733 447 A2 | 9/1996 |
| EP | 0 765 833 A1 | 4/1997 |
| FR | 577872 | 9/1924 |
| GB | 2 008 158 A | 5/1979 |
| JP | 8-257990 | 10/1996 |
| JP | 10-006126 A | 1/1998 |
| NL | 66591 | 5/1950 |

OTHER PUBLICATIONS

*Patent Abstracts of Japan*, vol. 197, No. 02 (Feb. 2, 1997) re JP No. 08–257,990 published Oct. 08, 1996, entitled "Device for Automatically Disposing of Cut Ear" by Fuji Photo Film Co., Ltd.

*Primary Examiner*—Stephen Choi
(74) *Attorney, Agent, or Firm*—Sughrue Mion, PLLC

(57) ABSTRACT

A winding device has a drive shaft having a flange, and a holder rotatably mounted on the drive shaft in covering relation to the flange, for winding the web therearound. The holder has a first torque adjustment plate rotatably mounted on the drive shaft and having a surface disposed in facing relation to a surface of the flange, the first torque adjustment plate supporting a plurality of magnets on the surface thereof, and a second torque adjustment plate rotatably mounted on the drive shaft and having a surface disposed in facing relation to an opposite surface of the flange, the second torque adjustment plate supporting a plurality of magnets on the surface thereof. The winding device is capable of winding relatively wide webs having a large thickness ranging from 100 to 150 $\mu$m, e.g., photographic photosensitive webs (films), with a low tension fluctuation ratio of ±5% or less, while producing large tension easily and stably. The winding device is constructed for easy maintenance.

9 Claims, 15 Drawing Sheets

U.S. PATENT DOCUMENTS

| | | | |
|---|---|---|---|
| 2,698,359 A | * 12/1954 | Roberts | 360/91 |
| 3,182,924 A | 5/1965 | Jones et al. | |
| 3,536,273 A | * 10/1970 | Hawkins | 242/523 |
| 3,573,517 A | 4/1971 | Osterstrom | |
| 3,595,495 A | 7/1971 | Cloeren | |
| 3,650,168 A | * 3/1972 | Ruschmann | 83/114 |
| 3,664,115 A | * 5/1972 | Watson | 57/31 |
| 3,762,250 A | * 10/1973 | Huskey | 83/27 |
| 3,934,833 A | 1/1976 | Nash et al. | |
| 4,063,692 A | 12/1977 | Buggy | |
| 4,109,842 A | 8/1978 | Aquilla | |
| 4,327,301 A | 4/1982 | Janson | |
| 4,497,455 A | 2/1985 | Kampf et al. | |
| 4,629,139 A | * 12/1986 | Sanda et al. | 242/415.1 |
| 4,905,926 A | 3/1990 | Celeste et al. | |
| 4,919,027 A | * 4/1990 | Littleton | 83/107 |
| 5,094,708 A | * 3/1992 | Bechtel et al. | 156/351 |
| 5,123,603 A | 6/1992 | Hayez et al. | |
| 5,180,115 A | 1/1993 | Stein | |
| 5,691,587 A | 11/1997 | Lamb | |
| 5,695,150 A | 12/1997 | Chevet et al. | |
| 5,727,724 A | * 3/1998 | Dowling | 226/181 |
| 5,826,474 A | 10/1998 | Howard et al. | |
| 5,899,129 A | * 5/1999 | Sumida et al. | 83/76.9 |
| 6,128,989 A | * 10/2000 | Jones et al. | 83/156 |
| 6,206,321 B1 | * 3/2001 | Pumpe | 242/525.3 |
| 6,357,691 B1 | 3/2002 | Watanabe et al. | |

* cited by examiner

WEB PROCESSING SYSTEM

This is a divisional of application Ser. No. 10/050,108 filed Jan. 18, 2002 now U.S. Pat. No. 6,464,162, which is a Divisional Application of U.S. application Ser. No. 09/417,119 (now U.S. Pat. No. 6,357,691) filed Oct. 13, 1999; the above noted prior applications are all hereby incorporated by reference.

BACKGROUND OF THE INVENTION

1. Field of the Invention

The present invention relates to a web processing system for slitting a wider web into a plurality of narrower webs for use as photographic photosensitive webs (films), and winding the narrower webs.

2. Description of the Related Art

Generally, web processing systems have a web slitting device for slitting a wider web of film, paper, metal foil, or the like into a plurality of narrower webs, and a winding device for winding the narrower webs.

The web processing systems also have a side edge delivery device for delivering side edges that are severed off the wider web when it is slit. Heretofore, the side edge delivery device comprises delivery rollers and nip rollers for nipping and delivering the side edges. For details, reference should be made to Japanese laid-open patent publication No. 8-257990, for example.

When the wider web is slit into the narrower webs by rotary blades, it is necessary for the side edge delivery device to apply a predetermined level of tension to the side edges in order to give highly accurate transverse dimensions to the narrower webs.

If the side edges were not tensioned or were tensioned excessively, then the wider web that reaches the rotary blades would be flexed, resulting in a reduction in the accuracy of the transverse dimensions of the narrower webs.

One conventional side edge delivery device which is capable of applying tension to side edges (hereinafter referred to as "conventional side edge delivery device") is disclosed in Japanese laid-open patent publication No. 10-6126, for example.

The conventional side edge delivery device comprises nip rollers that are pressed against delivery rollers under a constant pressure by cylinders, and motors operatively coupled to the delivery rollers by respective clutches. The clutches are supplied with exciting currents that are variable to apply a desired tension to the side edges.

As described above, for imparting a desired tension to the side edges, the cylinders are connected to the respective nip rollers and the clutches are operatively coupled between the delivery rollers and the motors. However, the clutches are responsible for an increase in the manufacturing cost of the conventional side edge delivery device.

The motors are rotated at a constant speed at all times, and the exciting currents of the clutches are controlled to set the side edge tension to a desired value. Therefore, while the slitting process is being suspended, the clutches slip at an increased speed, and hence tend to generate an increased amount of heat.

Winding devices that are in practical use for winding narrow webs having a small thickness ranging from 10 to 20 $\mu$m, e.g., ½-inch and 8 mm magnetic tapes, have a tension fluctuation ratio of ±5% or less.

However, winding devices for winding wide webs having a large thickness ranging from 100 to 150 $\mu$m, e.g., photographic photosensitive webs (films), with a low tension fluctuation ratio, have not yet been developed in the art.

As shown in FIG. 15 of the accompanying drawings, a conventional film winding device 500 comprises a drive shaft 504 with an air tube 502 disposed therein, and a winding core 512 rotatably mounted on the drive shaft 504 by bearings 506, 508, for winding a film 510 therearound. The conventional film winding device 500 also includes a displacement transmitting member 516 disposed around the air tube 502 within the winding core 512 and having a felt pad 514 mounted on a radially outer surface thereof.

When compressed air is introduced into the air tube 502, the air tube 502 is expanded to displace the displacement transmitting member 516 radially outwardly for thereby pressing the felt pad 514 against an inner wall surface of the winding core 512 for slipping contact therewith.

The torque that is generated when the felt pad 512 slips against the winding core 512 is used as a tension applied to the film 510 when the film 510 is wound around the winding core 512.

However, the conventional film winding device 500 is disadvantageous in that the tension applied to the film 510 is not stable and the tension fluctuation ratio can only be lowered to about ±15% even if the conventional film winding device 500 is well conditioned. Furthermore, the conventional film winding device 500 is unable to produce large tension because of its principles of operation. The maximum tension that can be generated by the conventional film winding device 500 is about 10 N at the most, when the width of a narrow web to be wound is 35 mm, for example. If more tension is produced, then the film 510 that is wound tends to be deformed due to the heat. Moreover, since the air tube 502 is mounted in the drive shaft 504 and the felt pad 514 is attached to the radially outer surface of the displacement transmitting member 516, the conventional film winding device 500 is complex in structure and its maintenance needs to be carried out by skillful operators.

SUMMARY OF THE INVENTION

It is therefore an object of the present invention to provide a web processing system for winding relatively wide webs having a large thickness ranging from 100 to 150 $\mu$m, e.g., photographic photosensitive webs (films), with a low tension fluctuation ratio of ±5% or less, while producing large tension easily and stably, the web processing system being constructed for easy maintenance.

Another object of the present invention is to provide a web processing system which can be manufactured inexpensively and is capable of slitting a wider web into a plurality of narrower webs having highly accurate transverse dimensions.

According to an aspect of the present invention, a winding device of a web processing system has a drive shaft having a flange, and a holder rotatably mounted on the drive shaft in covering relation to the flange, for winding the web therearound, the holder comprising a first torque adjustment unit rotatably mounted on the drive shaft and having a surface disposed in facing relation to a surface of the flange, the first torque adjustment unit supporting a plurality of magnets on the surface thereof, and a second torque adjustment unit rotatably mounted on the drive shaft and having a surface disposed in facing relation to an opposite surface of the flange, the second torque adjustment unit supporting a plurality of magnets on the surface thereof.

When the relative position of the first and second torque adjustment units is varied, the density of magnetic fluxes produced between the first and second torque adjustment units is varied.

When the drive shaft is rotated about its own axis, the flange positioned between the first and second torque adjustment units cuts the magnetic fluxes produced between the first and second torque adjustment units, generating eddy currents in the flange. Secondary magnetic fluxes produced in the flange by the eddy currents and the magnetic fluxes produced between the first and second torque adjustment units attract each other, producing a torque substantially proportional to a slipping speed, for example.

According to another aspect of the present invention, a winding device of a web processing system comprises a drive shaft having a ring, an annular conductor pressed against and secured to an outer circumferential surface of the ring, and a holder rotatably mounted on the drive shaft in covering relation to the ring, for winding the web therearound, the holder supporting on an inner circumferential surface thereof a magnet row of a plurality of magnets, the magnet row facing the annular conductor.

When the drive shaft is rotated about its own axis, the annular conductor cuts the magnetic fluxes produced between magnet rows, generating eddy currents in the annular conductor. Secondary magnetic fluxes produced in the flange by the eddy currents and the magnetic fluxes produced between the magnet rows attract each other, producing a torque substantially proportional to a slipping speed, for example.

According to still another aspect of the present invention, a winding device of a web processing system comprises a drive shaft having a torque transmitter, a support fixed to the torque transmitter, an annular conductor pressed against and secured to an outer circumferential surface of the support, and a holder rotatably mounted on the drive shaft in covering relation to the support, for winding the web therearound, the holder supporting on an inner circumferential surface thereof a magnet row of a plurality of magnets with a magnet holder, the magnet row facing the annular conductor.

When the drive shaft is rotated about its own axis, the annular conductor cuts the magnetic fluxes produced between magnet rows, generating eddy currents in the annular conductor. Secondary magnetic fluxes produced in the flange by the eddy currents and the magnetic fluxes produced between the magnet rows attract each other, producing a torque substantially proportional to a slipping speed, for example.

The number of magnets on the inner circumferential surface of the holder may be increased, and the magnets may be arranged in a plurality of magnet rows for changing the density of the magnetic fluxes generated between the magnet rows.

It is preferable that the magnets be spaced at a constant pitch on the holder.

Before the magnets are mounted in place, all the magnets may be measured for the strength of magnetic forces, and those magnets whose magnetic forces are weaker and those permanent magnets whose magnetic forces are stronger may be alternately arranged.

Since the torque can be generated on the holder without contacting the holder, even when a wide web having a large thickness ranging from 100 to 150 $\mu$m, e.g., a photographic photosensitive web (film), is to be wound, a tension fluctuation ratio may be set to ±5% or less. Therefore, the winding device can produce large tensions easily and stably.

Since any contact members such as felt pads are not present, and no air tube is mounted in the drive shaft, it is not necessary to take into account the service life of wearable components, and hence the maintenance of the winding device is facilitated.

It is preferable to provide cooling means for cooling at least the drive shaft and the holder.

If a narrow web having a small thickness ranging from 10 to 20 $\mu$m is to be wound, then since any tension required to be applied thereto may be small, the amount of heat generated in the winding process is small, and the web can be cooled by natural air cooling. However, if a wide web having a large thickness ranging from 100 to 150 $\mu$m, e.g., a photographic photosensitive web (film), is to be wound, then since the amount of heat generated in the winding process is large, the wound web may tend to be deformed due to the heat.

The cooling means is capable of effectively dissipating the heat generated in the winding process. Therefore, the winding device is effective to prevent the wound web from being deformed due to the heat.

The drive shaft may have a hollow space defined therein, and the cooling means may have cooling air introducing means for introducing cooling air from outside of the holder into the holder and the hollow space in the drive shaft.

The cooling means may have cooling fins mounted on a surface of the holder.

The cooling air introducing means may comprise a first cooling air passage for guiding the cooling air into the holder, and a second cooling air passage disposed in a portion of the drive shaft covered by the holder for guiding the cooling air introduced into the holder into the hollow space in the drive shaft.

According to yet another aspect of the present invention, a web processing system has at least a web slitting device for slitting a wider web into a plurality of narrower webs, the web slitting device comprising a rotary blade assembly for slitting a wider web which is being fed, along the direction of feed into a plurality of narrower webs, and side edge delivery means for delivering side edges produced from the wider web when the wider web is slit into the narrower webs, the side edge delivery means comprising a side edge delivery roller rotatable in a direction to deliver the side edges, a nip roller rotatable with the side edge delivery roller while gripping the side edges between the side edge delivery roller and the nip roller, and a nip roller pressing mechanism for pressing the nip roller against the side edge delivery roller under a predetermined pressure, the side edge delivery roller being rotatable at a peripheral speed higher than a peripheral speed of the rotary blade assembly.

The nip roller pressing mechanism may comprises a cylinder for displacing the nip roller in a direction toward the side edge delivery roller or a direction away from the side edge delivery roller, and a regulator for regulating an air pressure supplied to the cylinder to control the pressure under which the nip roller is pressed against the side edge delivery roller.

The peripheral speed of the side edge delivery roller may be higher than the peripheral speed of the rotary blade assembly by a value ranging from 0.5% to 5%.

The pressure applied from the nip roller to the side edge delivery roller is adjusted to apply a predetermined tension to the side edges. Consequently, the narrower webs are prevented from suffering an error in their transverse dimensions as when the tension applied to the side edges is released or the tension applied to the side edges becomes greater than the tension applied to the narrower webs.

Therefore, if the narrower webs are used as movie films or photographic negative films, then they assure high image quality.

The web processing system may further comprise a motor and a pair of speed reducer mechanisms, the rotary blade assembly and the side edge delivery roller being operatively coupled to the motor via the speed reducer mechanisms, respectively. This arrangement allows the web slitting device to be manufactured relatively inexpensively.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

A web processing system according to the present invention, as applied to a system for producing photographic photosensitive webs (films) (hereinafter referred to as "film production system"), for example, will be described below with reference to FIGS. 1 through 14.

A film production system 10 which can incorporate a web slitting device according to an embodiment of the present invention and winding devices according to first through third embodiments of the present invention will first be described below with reference to FIG. 1.

Figure 1:
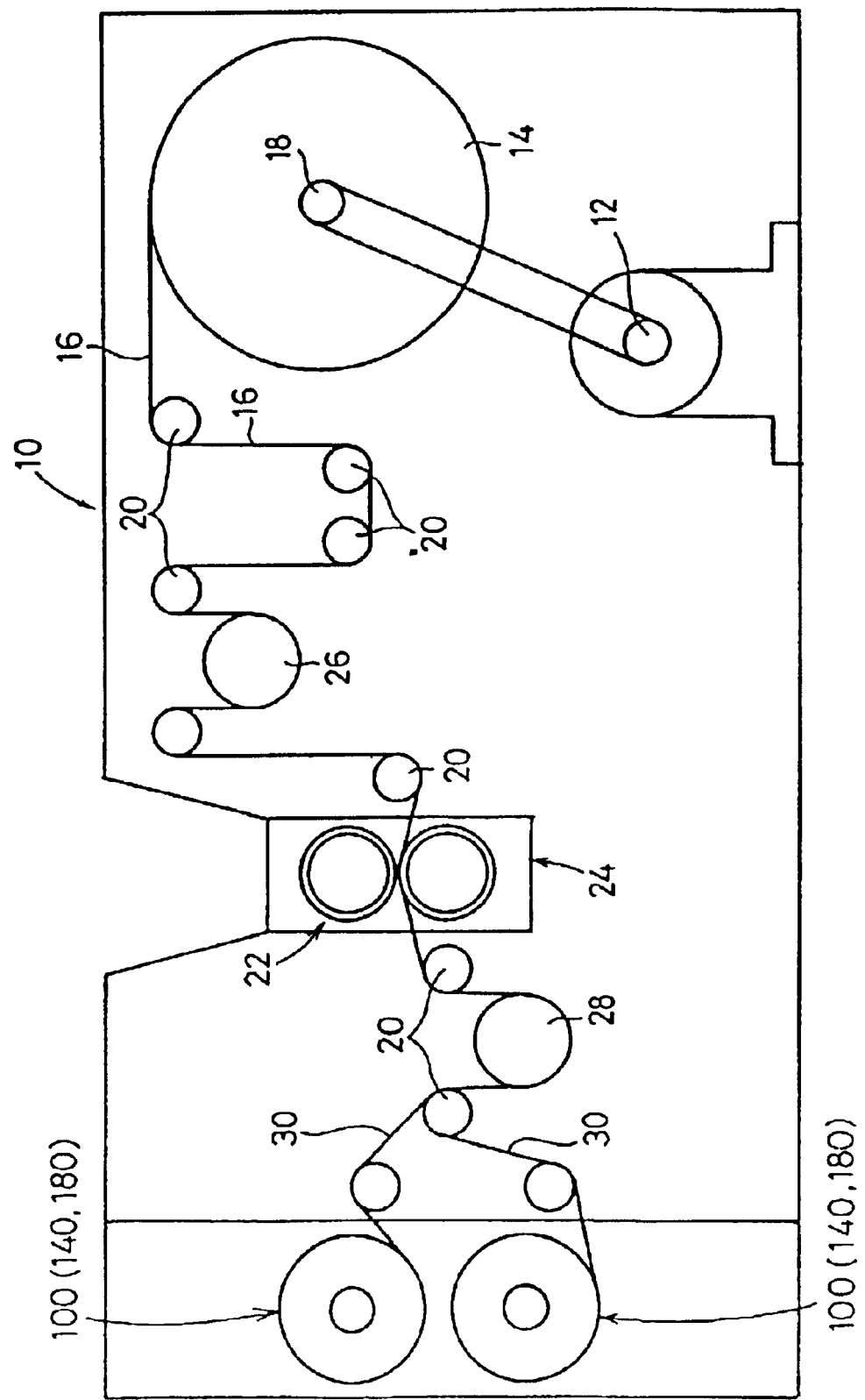
FIG. 1 is a schematic side elevational view of a film production system which can incorporate a web slitting device according to an embodiment of the present invention and winding devices according to first through third embodiments of the present invention.
Figure 2:
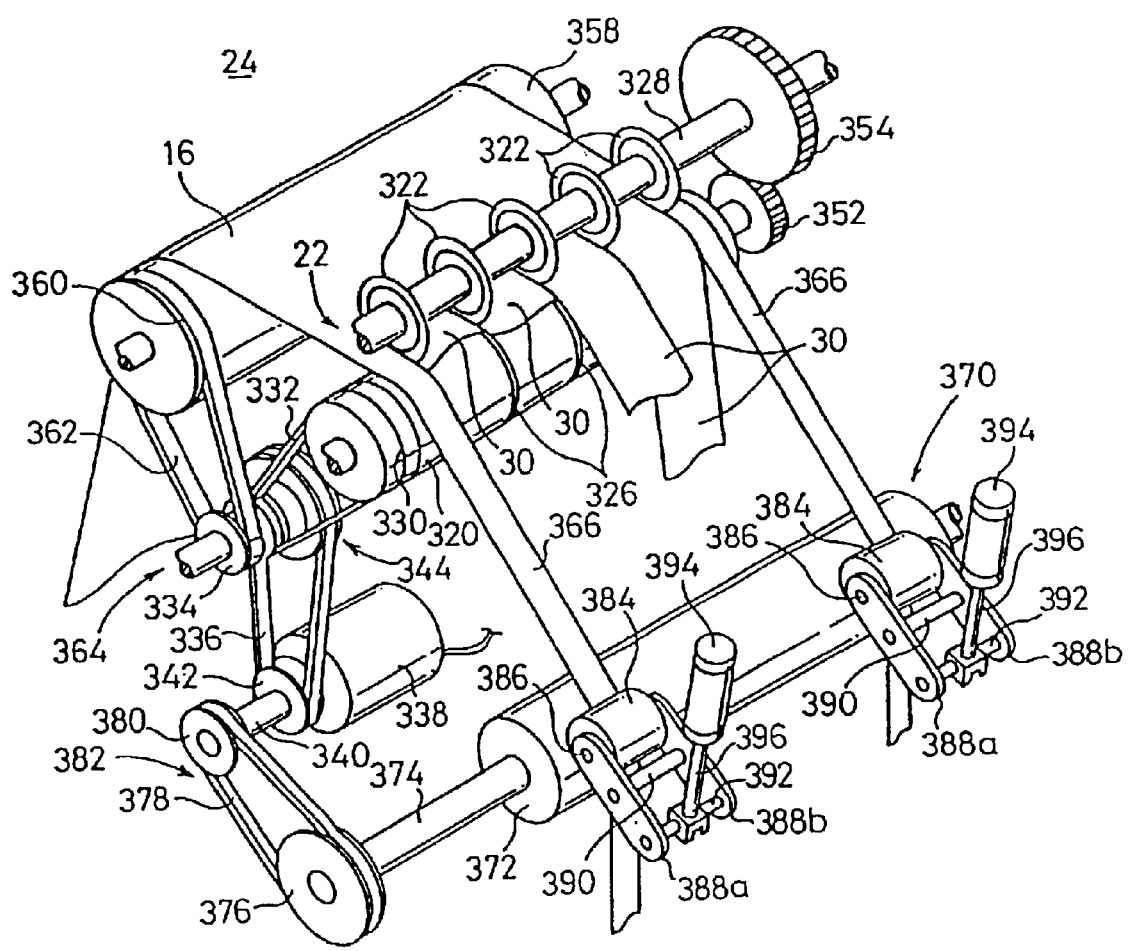
FIG. 2 is a perspective view of the web slitting device according to the embodiment of the present invention.

As shown in FIG. 1, the film production system 10 comprises a supply shaft 18 for feeding a wider web 16 from a web roll 14, a plurality of feed rollers 20 arranged along a feed path for the wider web 16, a web slitting device 24 having a rotary blade assembly 22 for continuously slitting the wider web 16 into narrower webs 30 of a predetermined width (e.g., a movie film width), first and second suction rollers 26, 28 for attracting and feeding the wider web 16 and the narrower webs 30, and first through third winding devices 100 (140, 180) for winding the narrower webs 30 slit by the web slitting device 24. In FIG. 2, the web slitting device 24 is represented by the rotary blade assembly 22 only. For details of the web slitting device 24, reference should be made to FIGS. 2 and 3.

The wider web 16 unreeled off the web roll 14 that is rotated by the supply shaft 18 is fed along the feed rollers 20 and reaches the first suction roller 26 that is positioned between the supply shaft 18 and the web slitting device 24. When the wider web 16 is brought into contact with the first suction roller 26, the wider web 16 is attracted to the first suction roller 26 under suction. Upon rotation of the first suction roller 26, the wider web 16 is delivered to the web slitting device 24. The wider web 16 is then slit into a plurality of narrower webs 30 by the rotary blade assembly 22.

The narrower webs 30 are then delivered via a feed roller 20 to the second suction roller 28 that is positioned between the web slitting device 24 and the winding devices 100. The narrower webs 30 are attracted by the second suction roller 28 under suction, and delivered thereby to the winding devices 100, which wind the supplied narrower webs 30.

The web slitting device 24 will be described in detail below with reference to FIGS. 2 and 3.

As shown in FIG. 2, the web slitting device 24 serves to slit a wider web 16 of film, paper, metal foil, or the like into a plurality of narrower webs 30 of a desired width. Actually, the web slitting device 24 slits the wider web 16 unwound from the web roll 14 by the supply shaft 18 into the narrower webs 30 and supplies the narrower webs 30 to the winding devices 100.

Tension adjustment devices (not shown) are positioned upstream and downstream of the web slitting device 24 for applying a predetermined tension to the wider web 16 introduced into the web slitting device 24 and the narrower webs 30 discharged from the web slitting device 24.

The web slitting device 24 has a rotary blade assembly 22 comprising a lower blade 320 and upper blades 322. The lower blade 320 has a plurality of annular grooves 326 axially spaced at intervals that are selected to meet transverse dimensions of web products to be obtained. The upper blades 322 are in the form of disks and fixedly mounted on a shaft 328 at respective positions vertically aligned with the respective grooves 326.

A pulley 330 is fixed to an end of the lower blade 320, and operatively coupled by a belt 332 to a pulley 334 which is operatively coupled by a belt 336 to a pulley 342 that is fixedly mounted on a drive shaft 340 of a motor 338. When the motor 338 is energized to rotate the drive shaft 340, the rotation of the drive shaft 340 is transmitted via the belt 336, the pulley 334, the belt 332, and the pulley 330 to the lower blade 320, which is rotated. The belt 336, the pulley 334, the belt 332, and the pulley 330 jointly make up a first speed reducer mechanism 344.

Figure 3:
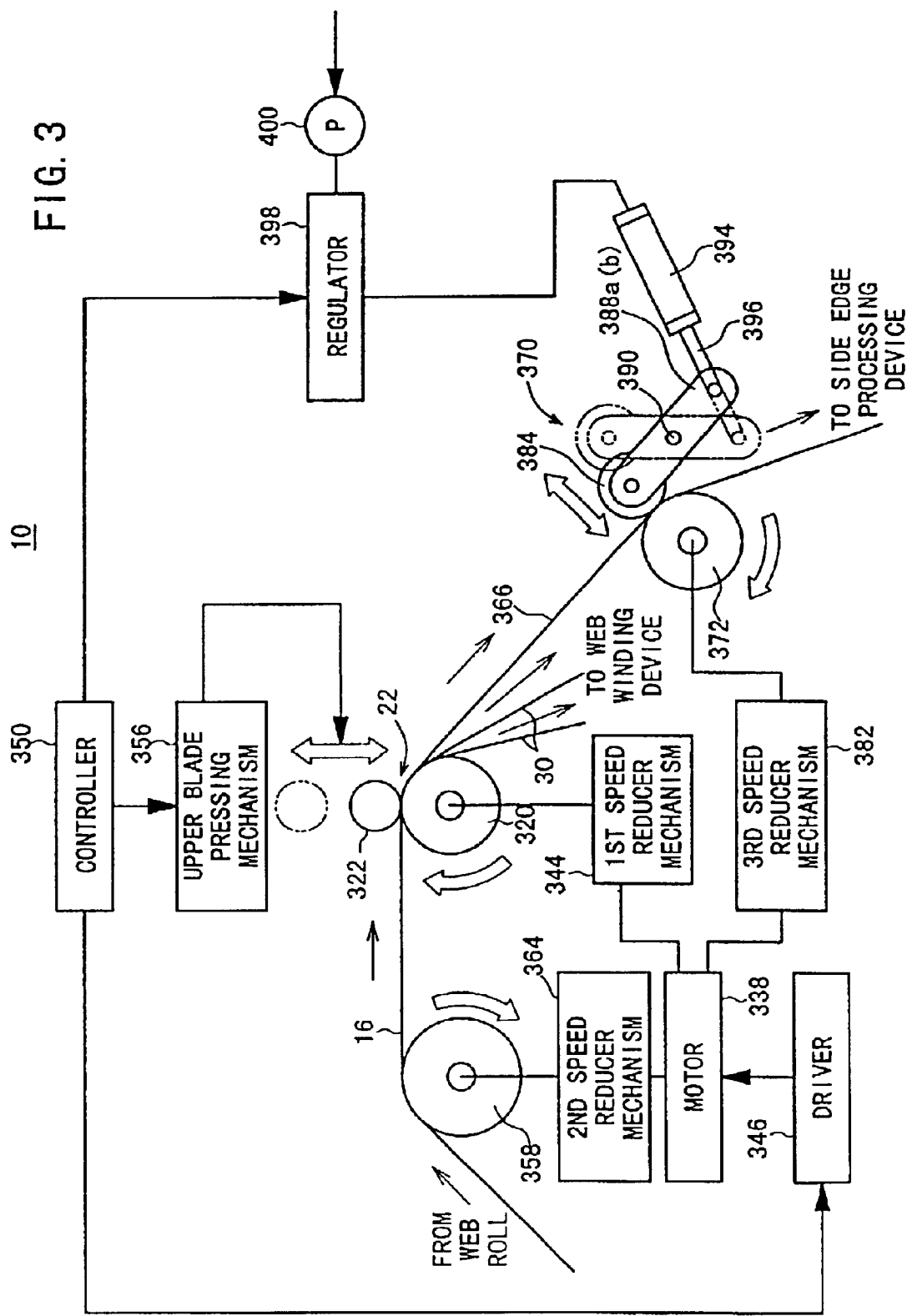
FIG. 3 is a block diagram of an arrangement for actuating the web slitting device according to the embodiment of the present invention.

As shown in FIG. 3, the motor 338 is energized by a current supplied from a driver 346 to which a control signal is supplied from a controller 350. The motor 338 rotates to generate a torque depending on the current supplied from the driver 346 based on the control signal from the controller 350.

As shown in FIG. 2, a gear 352 is mounted on the other end of the lower blade 320 and held in mesh with a gear 354 mounted on an end of the shaft 328 on which the upper blades 322 are fixedly mounted. Therefore, the rotation of the lower blade 320 causes the meshing gears 352, 354 to rotate the shaft 328 and hence the upper blades 322 in unison with the lower blade 320. The upper blades 322 have respective outer circumferential edges entering the respective grooves 326 in the lower blade 320, thereby slitting the wider web 16 into the narrower webs 30 whose widths correspond to the respective spacings between the grooves 326 and the upper blades 322.

As shown in FIG. 3, an upper blade pressing mechanism 356 is connected to the shaft 328 for pressing the upper blades 322 into the grooves 326 in the lower blade 320. The upper blades 322 can be displaced toward and away from the lower blade 320 by the upper blade pressing mechanism 356.

As shown in FIG. 2, a web feed roller 358 is disposed upstream of the rotary blade assembly 22. A pulley 360 is mounted on an end of the web feed roller 358 and operatively coupled to the pulley 334 by a belt 362. When the motor 338 is energized, the rotation of the drive shaft 340 is transmitted via the pulley 342 and the belt 336 to the pulley 334, whose rotation is then transmitted via the belt 362 and the pulley 360 to the web feed roller 358. The web feed roller 358 is rotated in unison with the rotary blade assembly 22 to supply the wider web 16 to the rotary blade assembly 22. The pulley 342, the belt 336, the pulley 334, the belt 362, and the pulley 360 jointly make up a second speed reducer mechanism 364.

A side edge delivery device (side edge delivery means) 370 is disposed downstream of the rotary blade assembly 22 at opposite ends of the wider web 16. The side edge delivery device 370 serves to deliver side edges 366 which are left from the wider web 16 when the wider web 16 is slit into the narrower webs 30, to a side edge processing device (not shown). The side edge delivery device 370 has a side edge delivery roller 372 having a shaft 374 on which a pulley 376 is mounted. The pulley 376 is operatively coupled by a belt 378 to a pulley 380 mounted on the drive shaft 340 of the motor 338. When the motor 338 is energized, the rotation of the drive shaft 340 is transmitted via the pulley 380, the belt 378, and the pulley 376 to the shaft 374, which rotates the side edge delivery roller 372. The pulley 376, the belt 378, and the pulley 380 jointly make up a third speed reducer mechanism 382.

The ratio of the diameters of the pulleys 376, 380, i.e., the pulley ratio, is selected such that the peripheral speed of the side edge delivery roller 372 is higher than the peripheral speed of the upper blades 322 and the lower blade 320 by a value ranging from 0.5% to 5.0%.

The side edge delivery device 370 has a pair of nip rollers 384 rotatable in unison with the side edge delivery roller 372 while the side edges 366 are being gripped between the nip rollers 384 and the side edge delivery roller 372. Each of the nip rollers 384 has a shaft 386 rotatably supported on a pair of spaced arms 388a, 388b angularly movable about a pivot shaft 390. A rod 392 extends between and is fixed to the arms 388a, 388b at ends thereof remote from the nip rollers 384. A cylinder 394 has a rod 396 fixed to a substantially central portion of the rod 392.

As shown in FIG. 3, a regulator 398 is connected to the cylinders 394 for supplying air from a pump 400 to the cylinders 394. The air supplied from the regulator 398 actuates the cylinders 394 to angularly displace the nip rollers 384 toward or away from the side edge delivery roller 372.

The regulator 398 regulates the pressure of air supplied to the cylinder 394 based on a control signal from the controller 350. The pressure applied to the side edge delivery roller 372 by the nip rollers 384 is controlled by the air pressure regulated by the regulator 398. Depending on the pressure thus controlled, the tension applied to the side edges 366 upstream of the side edge delivery device 370 is controlled so as to be substantially equal to the tension applied to the narrower webs 30, for example. The tension applied to the side edges 366 is controlled because the frictional forces generated between the side edges 366 and the side edge delivery roller 372 vary depending on the pressure applied to the side edge delivery roller 372 by the nip rollers 384. The side edge delivery roller 372 is made of a metal material, for example, and the nip rollers 384 are made of a synthetic resin or rubber.

The web slitting device 24 according to the embodiment of the present invention is basically constructed as described above. Operation and advantages of the web slitting device 24 will be described below.

When the motor 338 is energized with the upper blades 322 inserted in the respective grooves 326 in the lower blade 320 by the upper blade pressing mechanism 356, the rotary blade assembly 22, the web feed roller 358, and the side edge delivery roller 372 are rotated respectively by the first speed reducer mechanism 344, the second speed reducer mechanism 364, and the third speed reducer mechanism 382. The wider web 16 supplied to the rotary blade assembly 22 by the web feed roller 358 is slit into the narrower webs 30 by the lower blade 320 and the upper blades 322, and the narrower webs 30 are delivered to the winding devices 100 (see FIG. 1).

The side edges 366 which are left from the wider web 16 when the wider web 16 is slit into the narrower webs 30 are delivered by the side edge delivery roller 372 to the side edge processing device (not shown). At this time, the side edges 366 are gripped under a predetermined pressure between the nip rollers 384 and the side edge delivery roller 372. The pressure applied to the side edges 366 is controlled when the air pressure supplied to the cylinders 394 connected to the nip rollers 384 is regulated by the regulator 398.

The peripheral speed of the side edge delivery roller 372 is selected to be higher than the peripheral speed of the upper blades 322 and the lower blade 320 by a value ranging from 0.5% to 5.0%. Therefore, the pressure applied from the nip rollers 384 to the side edge delivery roller 372 can be regulated to control the tension applied to the side edges 366.

In this embodiment, the peripheral speed of the side edge delivery roller 372 is selected to be higher than the peripheral speed of the upper blades 322 and the lower blade 320 by a value ranging from 0.5% to 5.0%. The pressure applied from the nip rollers 384 to the side edge delivery roller 372 is controlled when the air pressure supplied to the cylinders 394 connected to the nip rollers 384 is regulated by the regulator 398. Consequently, the narrower webs 30 are prevented from suffering an error in their transverse dimensions as when the tension applied to the side edges 366 is released or the tension applied to the side edges 366 becomes greater than the tension applied to the narrower webs 30. Therefore, if the narrower webs 30 are used as movie films or photographic negative films, then they assure high image quality.

The rotary blade assembly 22 and the side edge delivery roller 372 are operatively coupled to the motor 338 by the first, second, and third speed reducer mechanisms 344, 364, 382. Thus, the web slitting device 24 can be manufactured at a reduced cost.

The winding devices 100, 140, 180 according to the first, second, and third embodiments, which can be incorporated in the film production system 10, will be described below with reference to FIGS. 4 through 14.

Figure 4:
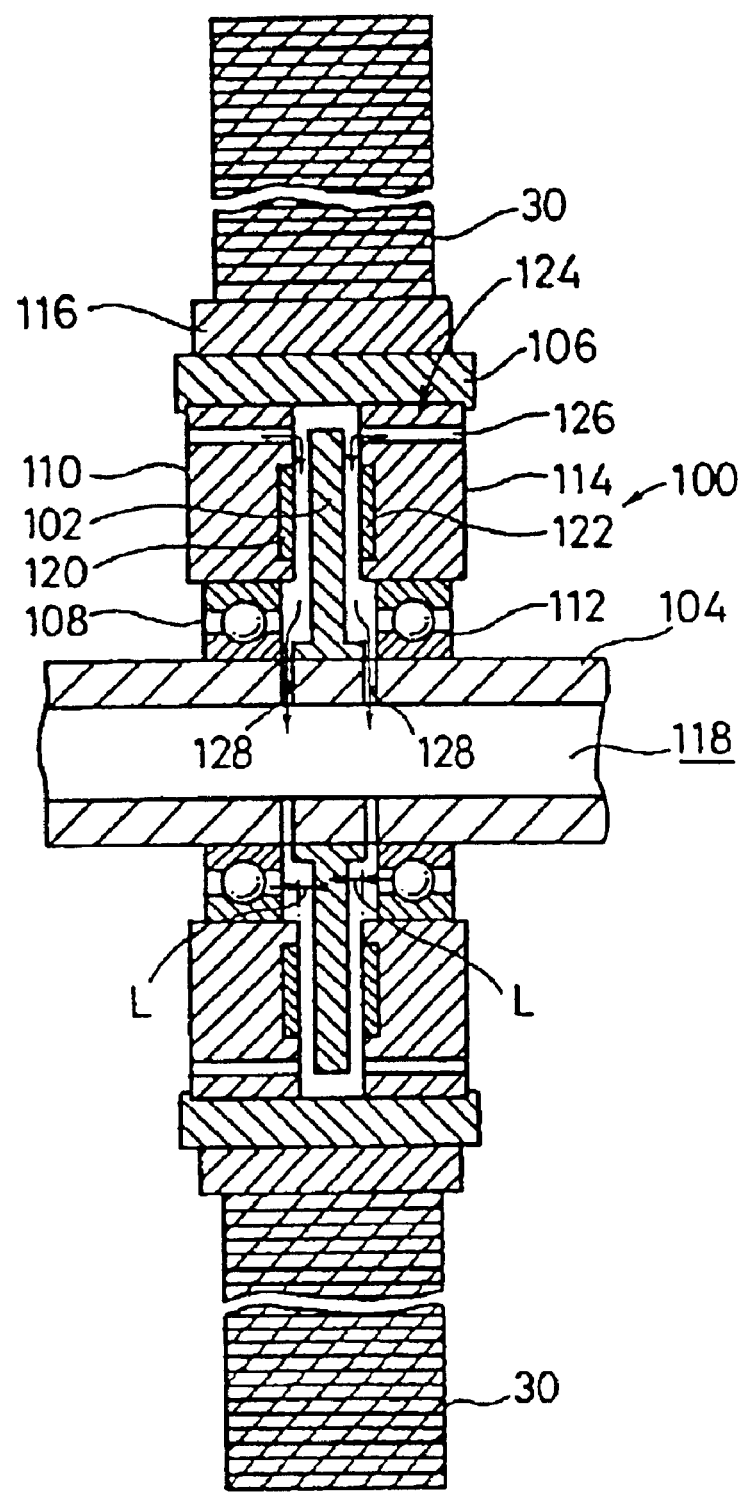
FIG. 4 is a vertical cross-sectional view of the winding device according to the first embodiment of the present invention.

As shown in FIG. 4, the winding device 100 according to the first embodiment comprises a drive shaft 104 having a flange 102, and a holder 106 rotatably mounted on the drive shaft 104 in covering relation to the flange 102, for winding the narrower web 30 therearound.

The drive shaft 104 has an axially extending hollow space 118 defined therein. The flange 102 mounted on the drive shaft 102 is made of metal, or more specifically has a central portion made of sheet steel and a surrounding portion of copper or copper alloy.

The holder 106 has a first torque adjustment plate 110 rotatably mounted on the drive shaft 104 by a first bearing 108 on one side of the flange 102, a second torque adjustment plate 114 rotatably mounted on the drive shaft 104 by a second bearing 112 on the other side of the flange 102, and a winding core 116 by which the first and second torque adjustment plates 110, 114 are fixed to each other at any arbitrary relative position and which winds the narrower web 30 therearound.

The first torque adjustment plate 110 has a surface disposed in facing relation to a surface of the flange 102, and supports a plurality of permanent magnets 120 on the surface thereof that are spaced at a constant pitch. The second torque adjustment plate 114 has a surface disposed in facing relation to an opposite surface of the flange 102, and supports a plurality of permanent magnets 122 on the surface thereof that are spaced at a constant pitch. The first and second torque adjustment plates 110, 114 are supported in the holder 106 such that the distances L between the first and second torque adjustment plates 110, 114 and the flange 102 can be varied as desired.

The winding device 100 according to the first embodiment also has a cooling means 124 for cooling at least the drive shaft 104 and the holder 106.

The cooling means 124 comprises first cooling holes 126 defined in the first and second torque adjustment plates 110, 114, second cooling holes 128 defined in a portion of the drive shaft 104 covered by the holder 106, and a suction device (not shown) connected to an end of the drive shaft 104.

When the suction device is actuated, ambient cooling air is introduced via the first cooling holes 126 into the holder 106, and then introduced via the second cooling holes 128 into the hollow space 118 in the drive shaft 104.

The cooling means 124 thus functions to introduce cooling air from outside of the holder 106 into the holder 106 and the hollow space 118 in the drive shaft 104.

The winding device 100 according to the first embodiment is basically constructed as described above. Operation and advantages of the winding device 100 will be described below.

When the relative position of the first and second torque adjustment plates 110, 114 is varied, the density of magnetic fluxes produced between the first and second torque adjustment plates 110, 114 is varied.

When the drive shaft 104 is rotated about its own axis, the flange 102 positioned between the first and second torque adjustment plates 110, 114 cuts the magnetic fluxes produced between the first and second torque adjustment plates 110, 114, generating eddy currents in the flange 102. Secondary magnetic fluxes produced in the flange 102 by the eddy currents and the magnetic fluxes produced between the first and second torque adjustment plates 110, 114 attract each other, producing a torque substantially proportional to a slipping speed, for example. The slipping speed represents the difference between the rotational speed of the drive shaft 104 and the rotational speed of the holder 106.

Since the torque can be generated on the holder 106 without contacting the holder 106, even when a wide web having a large thickness ranging from 100 to 150 $\mu$m, e.g., a photographic photosensitive web (film), is to be wound, a tension fluctuation ratio may be set to ±5% or less with respect to a tension of 2 kg, for example. Therefore, the winding device 100 can produce large tensions easily and stably. For example, the winding device 100 can produce large tensions ranging from 500 g to 3 kg.

Inasmuch as the winding device 100 can produce stable winding tensions, the wound web suffers a relatively small transverse displacement. For example, the transverse displacement of the wound web can be reduced from a conventional value of 3 mm to a value ranging from 0.5 to 1.0 mm. As a result, the wound web has a neatly coiled appearance free of appearance defects. The winding device 100 is suitable for use in winding a narrow web having a relatively large thickness ranging from 50 to 300 $\mu$m.

The torque is determined depending on the strength of the magnetic fields produced by the permanent magnets 120, 122 on the first and second torque adjustment plates 110, 114, the distances between the first and second torque adjustment plates 110, 114 and the flange 102, and the speed of the flange 102 which cuts the magnetic fluxes generated between the first and second torque adjustment plates 110, 114 and the flange 102. The torque can easily be set to a desired value by changing these parameters, i.e., the strength of the magnetic fields, the distances, and the speed of the flange 102.

In the first embodiment, since any contact members such as felt pads are not present, and no air tube is mounted in the drive shaft 104, it is not necessary to take into account the service life of wearable components, and hence the maintenance of the winding device 100 is facilitated.

If a narrow web having a small thickness ranging from 10 to 20 $\mu$m is to be wound, then since any tension required to be applied thereto may be small, the amount of heat generated in the winding process is small, and the web can be cooled by natural air cooling. However, if a wide web having a large thickness ranging from 100 to 150 $\mu$m, e.g., a photographic photosensitive web (film), is to be wound, then since the amount of heat generated in the winding process is large, the wound web may tend to be deformed due to the heat.

The winding device 100 according to the first embodiment has the cooling means 124 for effectively dissipating the heat generated in the winding process. Therefore, the winding device 100 is effective to prevent the wound web from being deformed due to the heat.

According to the first embodiment, the cooling means 124 has the first cooling holes 126 defined in the first and second torque adjustment plates 110, 114, and the second cooling holes 128 defined in the drive shaft 104, and cooling air is introduced from outside of the holder 106 into the holder 106 and the hollow space 118 in the drive shaft 104. Because the air thus introduced can remove dust particles from within the holder 106, the rotatable components of the winding device 100 are effectively prevented from being unduly worn by dust particles.

For the production of photographic films, the narrower webs 30 are wound by the corresponding winding devices 100. Accordingly, any torque variations between the winding devices 100 should preferably be eliminated. In the first embodiment, the slipping speed N is constant, and the distances L between the first and second torque adjustment plates 110, 114 and the flange 102 are equalized to a constant value. These parameter settings can reduce any torque variations between the winding devices 100 to a value ranging from about 2 to 3%.

In the first embodiment, the two bearings 108, 112 are used in the holder 106. In order to reduce torque variations between the bearings 108, 112, the bearings 108, 112 are degreased in a cleaning process, and then lubricated by several drops of oil whose viscosity ranges from SAE 20 through 30.

Figure 5:
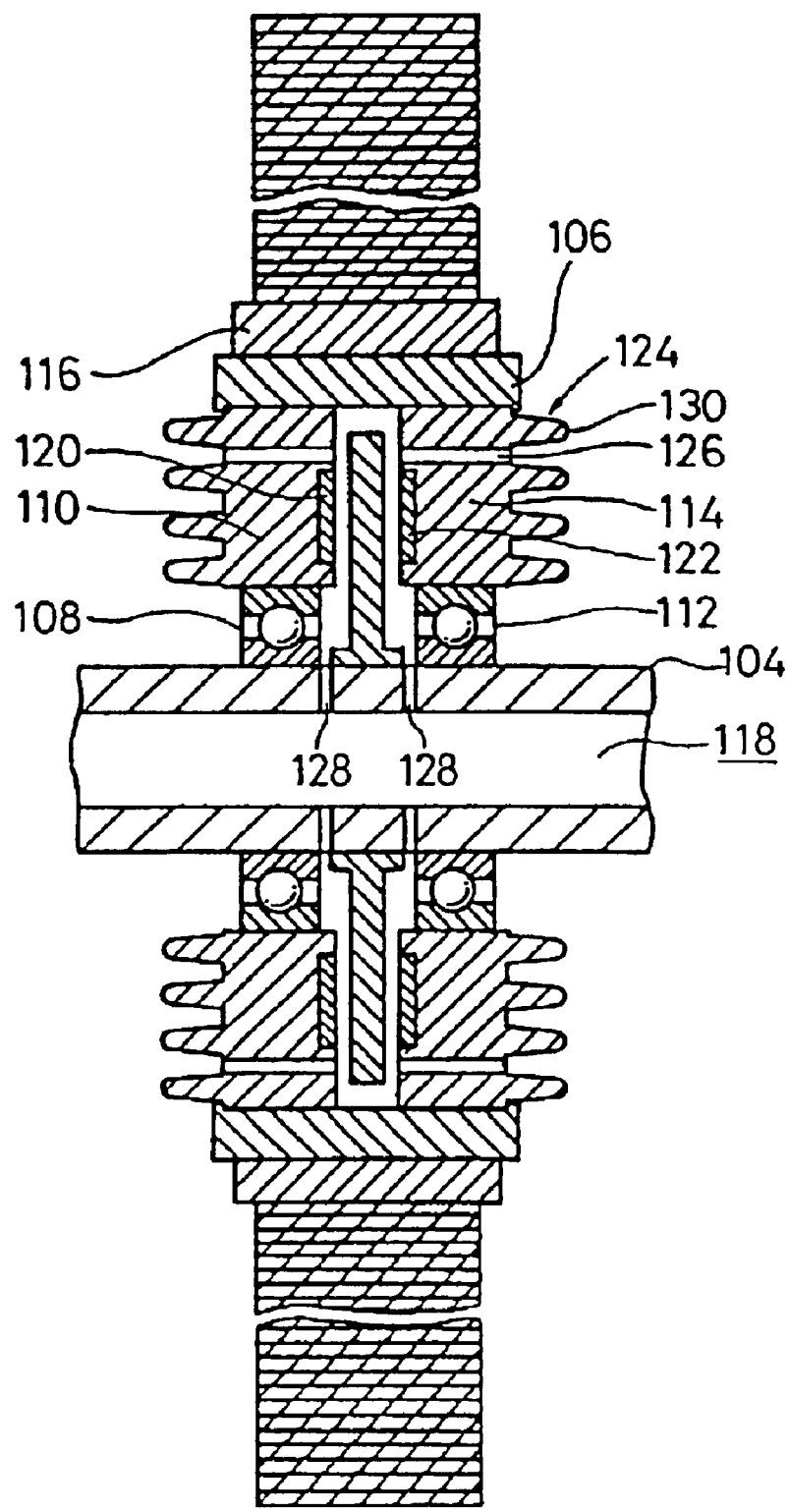
FIG. 5 is a vertical cross-sectional view of a modification of the winding device according to the first embodiment of the present invention.

As shown in FIG. 5, the cooling means 124 may comprise cooling fins 130 on the surface of the holder 106. The cooling fins 130 may be or may not be combined with the first and second cooling holes 126, 128.

If the cooling fins 130 are employed, a nozzle should preferably be provided to apply air to the cooling fins 130. The cooling fins 130 are effective to increase the cooling capability of the cooling means 124, thus allowing the winding device to wind wider and thicker webs.

There is an ideal tension curve for winding the web 30. When the web 30 is wound by the winding device 100, the diameter of the web 30 coiled on the holder 106 gradually increases, resulting in a reduction in the rotational speed of the holder 106. As the rotational speed of the holder 106 decreases, the tension decreases as indicated by the tension curve a in FIG. 10 away from an ideal tension curve b. Therefore, the rotational speed of the drive shaft 104, which is normally constant, is increased by 20 through 30% to bring the tension curve a closely to the ideal tension curve b.

Different materials and dimensions of webs 30 to be wound on the holder 106 have different tension curves b. However, by selecting the rotational speed of the drive shaft 104 depending on the diameter of the web coil, as described above, the tension curve of a certain web to be wound can be brought closely to the optimum tension curve.

The winding device 140 according to the second embodiment will be described below with reference to FIGS. 6 and 7.

Figure 6:
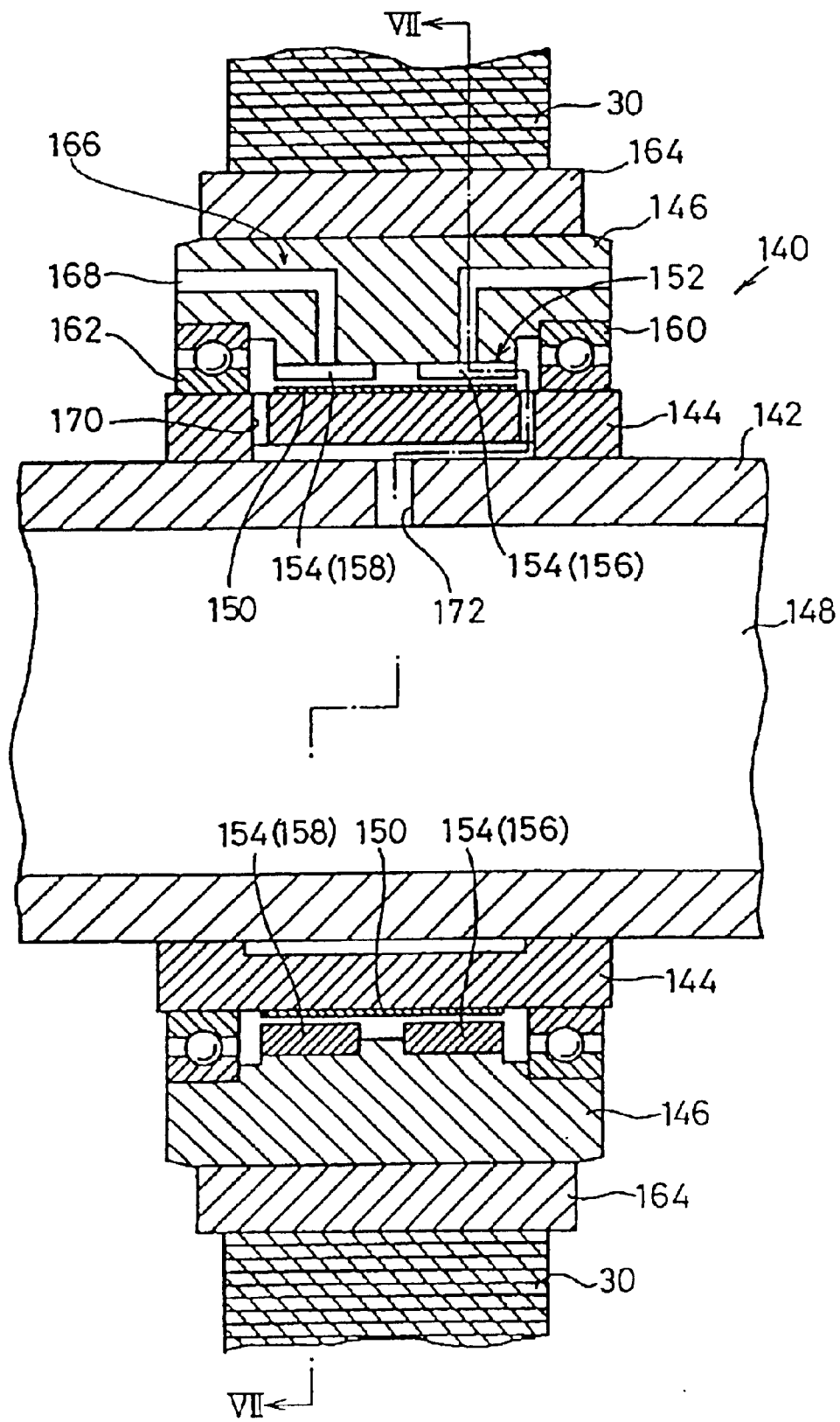
FIG. 6 is a vertical cross-sectional view of the winding device according to the second embodiment of the present invention, the view being taken along line VI—VI of FIG. 7.
Figure 7:
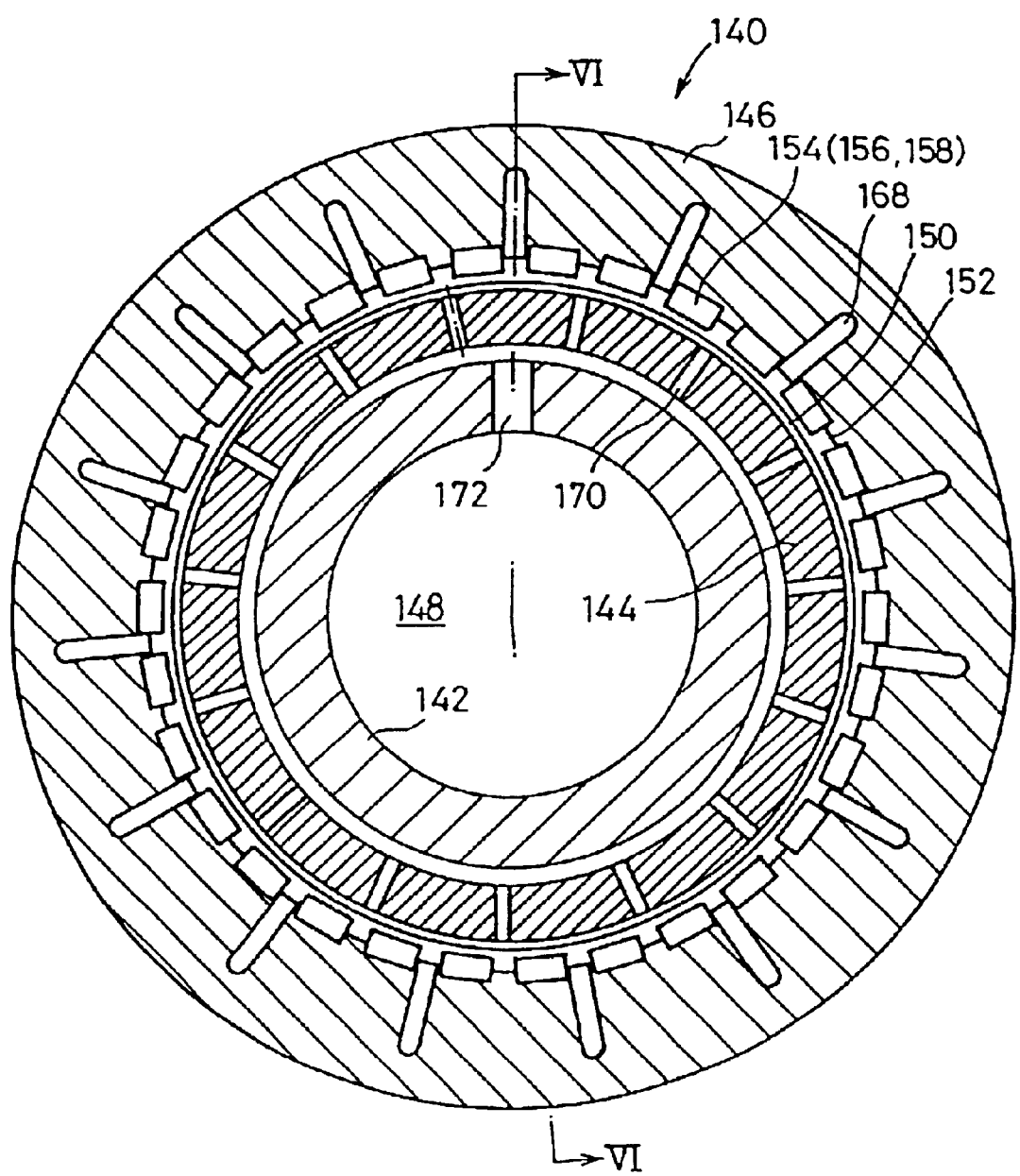
FIG. 7 is a cross-sectional view taken along line VII—VII of FIG. 6.

As shown in FIGS. 6 and 7, the winding device 140 according to the second embodiment comprises a drive shaft 142, a ring 144 of metal fixedly mounted on the drive shaft 142 and having a certain axial width, and a substantially cylindrical holder 146 rotatably mounted on the drive shaft 142 in covering relation to the ring 144, for winding the narrower web 30 therearound.

The drive shaft 142 has an axially extending hollow space 148 defined therein. A seamless annular copper sheet 150 is pressed against and secured to an outer surface of the ring 144.

A plurality of permanent magnets 154 are mounted on an inner surface 152 of the holder 146 which radially confronts the ring 144. The permanent magnets 154 are spaced at a constant pitch and arrayed in permanent magnet rows 156, 158. The permanent magnet rows 156, 158 and the annular copper sheet 150 face each other radially of the drive shaft 142.

The holder 146 is rotatably mounted on the drive shaft 142 by a first bearing 160 and a second bearing 162, and supports on its outer surface a winding core 164 for winding the web 30 therearound.

The winding device 140 has a cooling means 166 for cooling at least the drive shaft 142 and the holder 146.

The cooling means 166 comprises first cooling holes 168 defined in the holder 146, second cooling holes 170 defined in the ring 144, third cooling holes 172 defined in a portion of the drive shaft 142 which is covered by the ring 144, and a suction device (not shown) connected to an end of the drive shaft 142.

When the suction device is actuated, ambient cooling air is introduced via the first cooling holes 168 into the holder 146, and then introduced via the second and third cooling holes 170, 172 into the hollow space 148 in the drive shaft 142.

The cooling means 166 thus functions to introduce cooling air from outside of the holder 146 into the holder 146 and the hollow space 148 in the drive shaft 142.

The winding device 140 according to the second embodiment is basically constructed as described above. Operation and advantages of the winding device 140 will be described below.

Magnetic fluxes are generated by magnetic forces of the permanent magnet rows 156, 158 disposed on the inner surface 152 of the holder 146.

When the drive shaft 142 is rotated about its own axis, the ring 144 fixed to the drive shaft 142 rotates in unison with the drive shaft 142, and the annular copper sheet 150 pressed against the ring 144 cuts the magnetic fluxes generated between the permanent magnet rows 156, 158, generating eddy currents in the ring 144. Secondary magnetic fluxes by the eddy currents and the magnetic fluxes produced between the permanent magnet rows 156, 158 attract each other, producing a torque substantially proportional to a slipping speed, for example. The slipping speed represents the difference between the rotational speed of the drive shaft 142 and the rotational speed of the holder 146.

Since the torque can be generated on the holder 146 without contacting the holder 146, even when a wide web having a large thickness ranging from 100 to 150 $\mu$m, e.g., a photographic photosensitive web (film), is to be wound, a tension fluctuation ratio may be set to ±5% or less. Therefore, the winding device 140 can produce large tensions easily and stably.

Inasmuch as the stable winding tension can be produced, any transverse displacement of the wound web or a web coil appearance defect can be reduced. For example, such transverse displacement of the wound web can be reduced from a conventional value ranging from 2.0 to 5.0 mm to a value ranging from 0.5 to 1.0 mm. As a result, undue wear of the edges of wound webs, which would otherwise occur due to abrasive contact with each other, is eliminated, and the web coils suffer less damage on their edges.

The winding device 140 is not limited to winding the photographic photosensitive webs (films), but is suitable for use in winding a wide web of paper, cloth, etc. having a relatively large thickness ranging from 50 to 300 $\mu$m and a width ranging from 15 to 70 mm.

The winding device 140 according to the second embodiment has the cooling means 166 which functions to introduce cooling air from outside of the holder 146 into the holder 146 and the hollow space 148 in the drive shaft 142.

Because the annular copper sheet 150, which is a source of heat generated when the web 30 is wound, is pressed against the ring 144 fixedly mounted on the drive shaft 142 that is a last component to be cooled by the introduced air, the holder 146 is cooled without being thermally affected. The cooling air which has been heated by the annular copper sheet 150 is discharged out of the winding device 140 without thermally affecting the other components. Therefore, the cooling capability of the cooling means 166 is increased to prevent the would web 30 from being unduly deformed.

The number of permanent magnets 154 in the permanent magnet rows 156, 158 can be increased to increase the density of the magnetic fluxes generated between the permanent magnet rows 156, 158 for thereby reducing the slipping speed for obtaining certain tension and suppressing the heating of the annular copper sheet 150.

The winding device 180 according to the third embodiment will be described below with reference to FIGS. 8 and 9.

Figure 8:
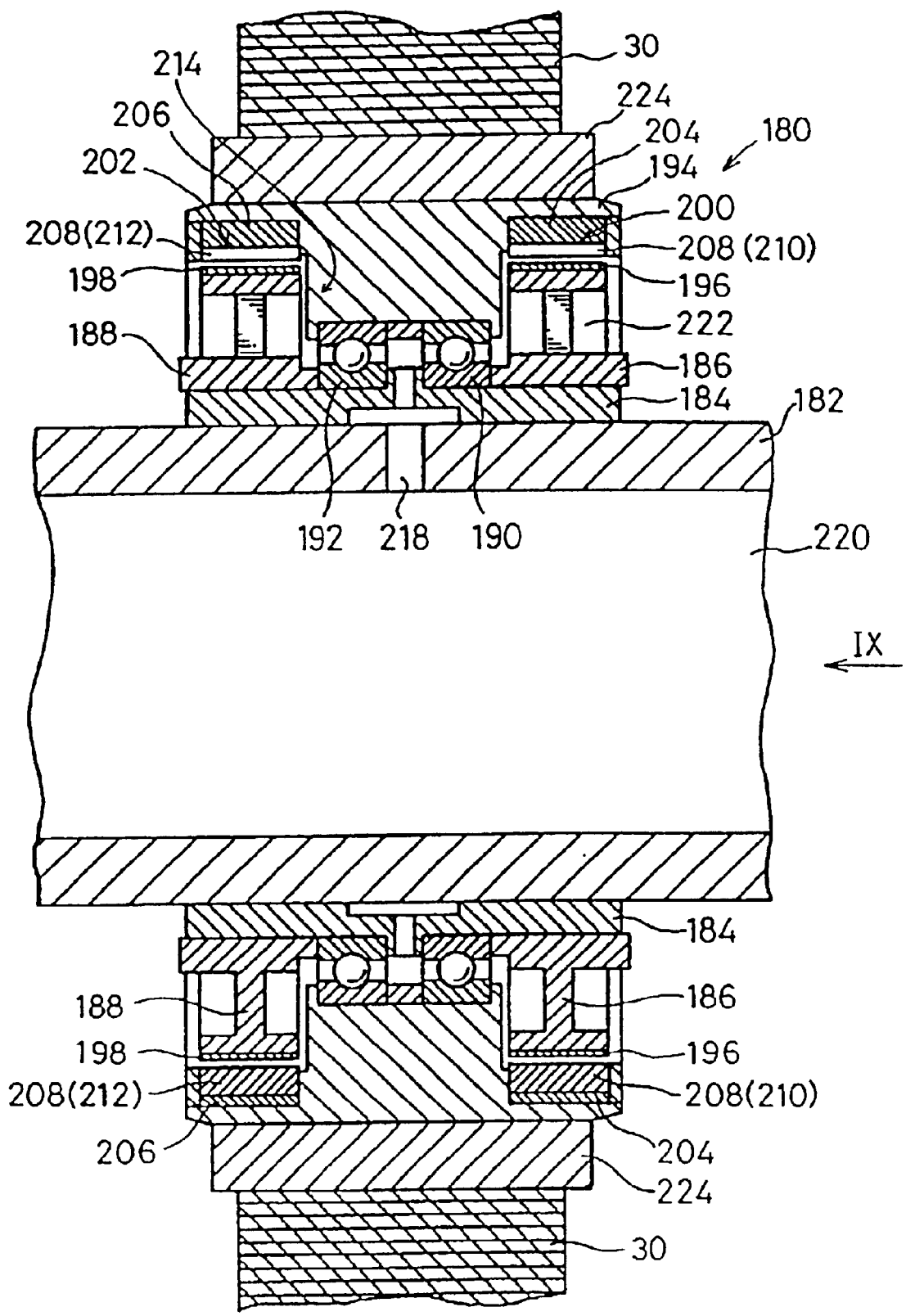
FIG. 8 is a vertical cross-sectional view of the winding device according to the third embodiment of the present invention, the view being taken along line VIII—VIII of FIG. 9.
Figure 9:
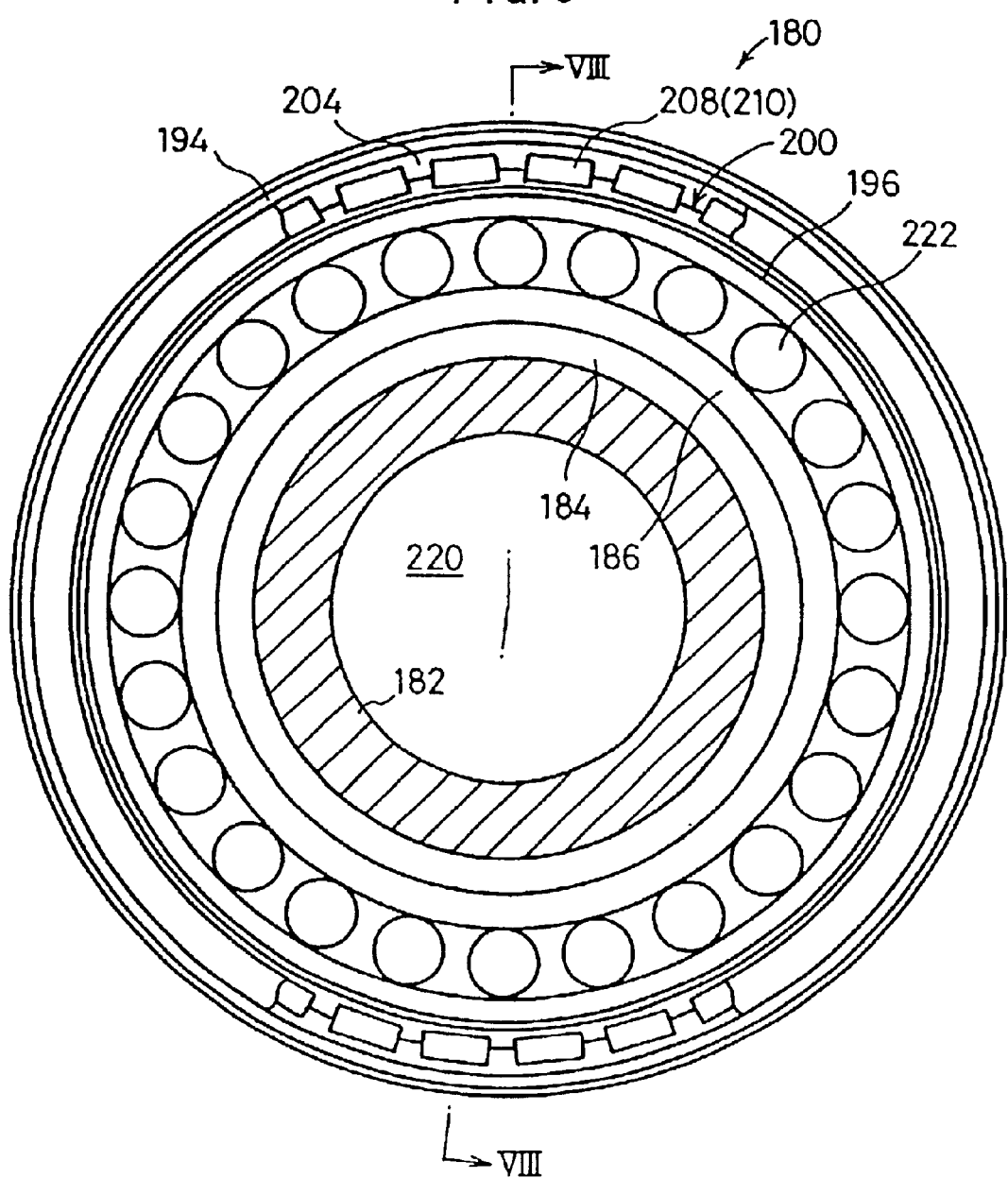
FIG. 9 is a side elevational view as viewed in the direction indicated by the arrow IX in FIG. 8.
Figure 10:
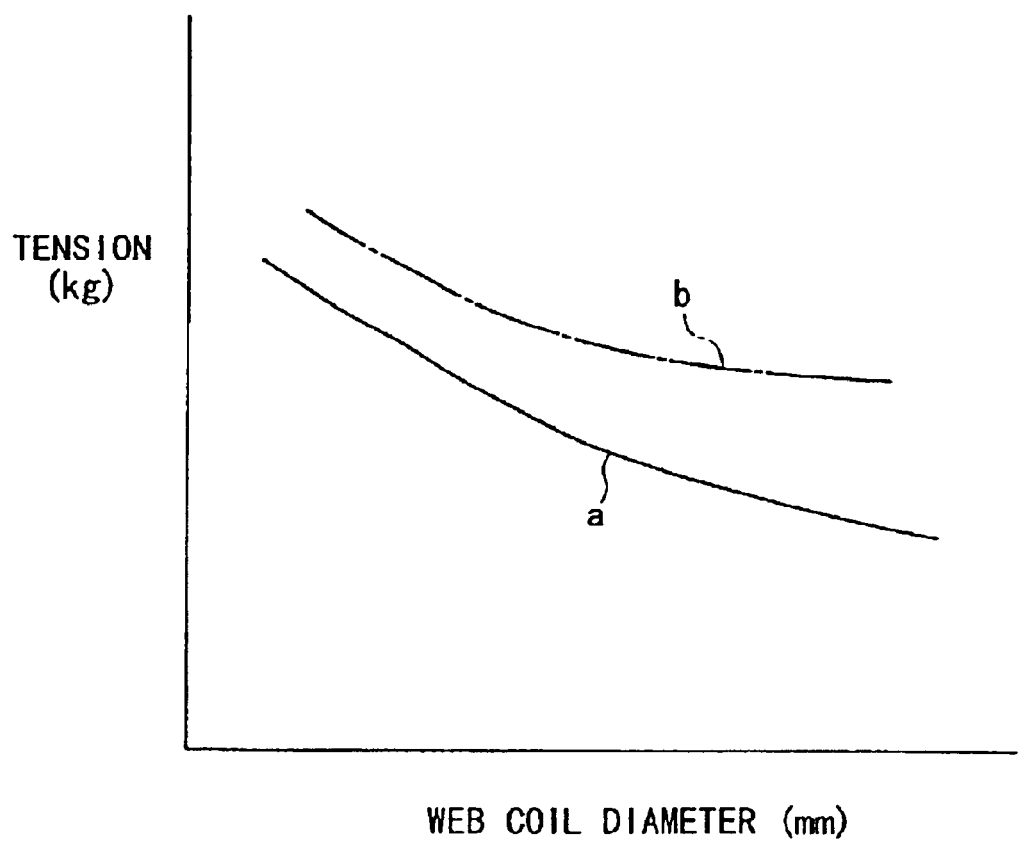
FIG. 10 is a diagram showing the manner in which tension varies depending on the diameter of a web coil.

As shown in FIGS. 8 and 9, the winding device 180 comprises a drive shaft 182 having an axially extending hollow space 220 defined therein, a torque transmitter 184 fixedly mounted on the drive shaft 182 for transmitting a torque in response to rotation of the drive shaft 182, a pair of axially spaced supports 186, 188 fixedly mounted on the torque transmitter 184, and a holder 194 rotatably mounted on the drive shaft 182 by first and second bearings 190, 192.

The holder 194 supports on its outer surface a winding core 224 for winding the narrower web 30.

Each of the supports 186, 188 comprises an annular member of metal having hollow spaces 222 defined therein. Seamless annular copper sheets 196, 198 are pressed against and secured to respective outer surfaces of the supports 186, 188 remote from the torque transmitter 184. The holder 194 has circumferential surfaces 200, 202 on which a plurality of permanent magnets 208 are mounted by magnetic holders 204, 206. The permanent magnets 208 are spaced at a constant pitch and arrayed in permanent magnet rows 210, 212.

The annular copper sheets 196, 198 and the permanent magnet rows 210, 212 face each other radially of the drive shaft 182.

The winding device 180 has a cooling means 214 for cooling at least the drive shaft 182 and the holder 194.

The cooling means 214 comprises cooling holes 218 defined through the torque transmitter 184 and the drive shaft 182, and a suction device (not shown) connected to an end of the drive shaft 182.

When the suction device is actuated, ambient cooling air is introduced via gaps between the copper sheets 196, 198 pressed against the supports 186, 188 and the permanent magnet rows 210, 212 and gaps between the permanent magnets 208 to the holder 194, and then via the cooling holes 218 into the hollow space 220 in the drive shaft 182. Ambient cooling air is also introduced via the hollow spaces 222 in the supports 186, 188 to the holder 194, and then via the cooling holes 218 into the hollow space 220 in the drive shaft 182.

Therefore, the cooling means 214 thus functions to introduce cooling air from outside of the holder 194 into the holder 194 and the hollow space 220 in the drive shaft 182.

The winding device 180 according to the third embodiment is basically constructed as described above. Operation and advantages of the winding device 180 will be described below.

When the drive shaft 182 is rotated about its own axis, the torque transmitter 184 fixedly mounted on the drive shaft 182 is rotated in unison with the drive shaft 182, and the copper sheets 196, 198 pressed against the supports 186, 188 fixedly mounted on the torque transmitter 184 cut the magnetic fluxes generated by the permanent magnets 208 of the permanent magnet rows 210, 212.

Therefore, eddy currents are generated in the copper sheets 196, 198, and secondary magnetic fluxes by the eddy currents and the magnetic fluxes produced by the permanent magnet rows 210, 212 attract each other, producing a torque substantially proportional to a slipping speed, for example.

The cooling means 214 of the winding device 180 is effective to dissipate the heat generated when the winding device 180 winds the narrower web 30.

The drive shaft 182, the torque transmitter 184, the supports 186, 188, and the annular copper sheets 196, 198 are integrally held together, and made of metal.

Therefore, the heat generated by the annular copper sheets 196, 198, which are a heat source at the time the web is wound, can easily be transferred via the supports 186, 188 and the torque transmitter 184 to the drive shaft 182 for increased cooling efficiency.

In the third embodiment, the two bearings 190, 192 are used in the holder 194. In order to reduce torque variations between the bearings 190, 192, the bearings 190, 192 are degreased in a cleaning process, and then lubricated by several drops of oil whose viscosity ranges from SAE 20 through 30.

In the third embodiment, before the permanent magnets 208 are mounted at a constant pitch on the circumferential surfaces, 200, 202 of the holder 194 by the magnetic holders 204, 206, all the permanent magnets 208 are measured for the strength of magnetic forces.

Thereafter, when the permanent magnets 208 are to be installed on the holder 194 by the magnetic holders 204, 206 and arrayed as the permanent magnet rows 210, 212, those permanent magnets 208 whose magnetic forces are weaker and those permanent magnets 208 whose magnetic forces are stronger are alternately arranged to uniformize the strengths of the magnetic forces generated by the permanent magnet rows 210, 212. It is preferable to employ as many permanent magnets 208 as possible to provide the permanent magnet rows 210, 212.

As a consequence, the magnetic forces are uniformized in balance, and the density of the magnetic fluxes is increased, so that the slipping speed can be lowered and the amount of generated heat can be reduced.

The above advantages hold true for the above second embodiment.

The holder 194 should preferably have a stopper for preventing the winding core 224 from being unduly displaced axially, and a pin for preventing the winding core 224 from being unduly displaced circumferentially.

An experimental example of the winding device according to the first embodiment will be described below. In the experimental example, tension fluctuation ratios were measured with respect to inventive and comparative examples. Each of the inventive and comparative examples had the same structure as the winding device 100 according to the first embodiment. In the inventive example, the cooling means 124 is operated, i.e., the suction device is actuated. In the comparative example, the cooling means 124 is not operated.

Figure 11:
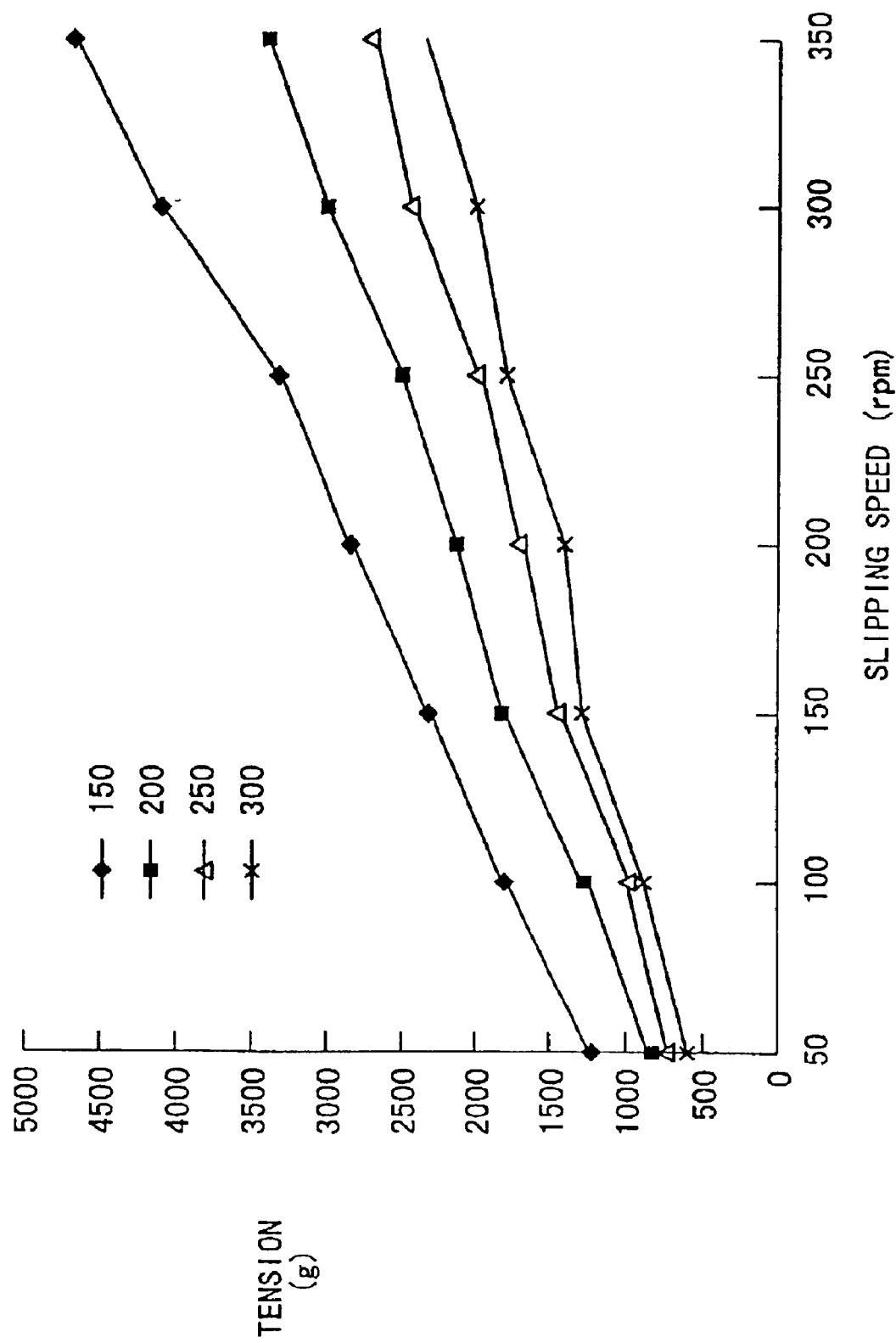
FIG. 11 is a diagram showing the manner in which tension varies depending on a slipping speed in an inventive example.

In the inventive example, several measuring positions were determined, and the tension was measured for variations at the measuring positions when the slipping speed, i.e., the difference between the rotational speed of the drive shaft 104 and the rotational speed of the holder 106, gradually increased. The measured results are shown in FIG. 11.

The measuring positions were at the web coil diameter of 150 mm (- ♦ -), the web coil diameter of 200 mm (- ■ -), the web coil diameter of 250 mm (- Δ -), and the web coil diameter of 300 mm (- × -). It can be seen from the measured results shown in FIG. 11 that the tension is substantially proportional to the slipping speed at each of the measuring positions.

Figure 12:
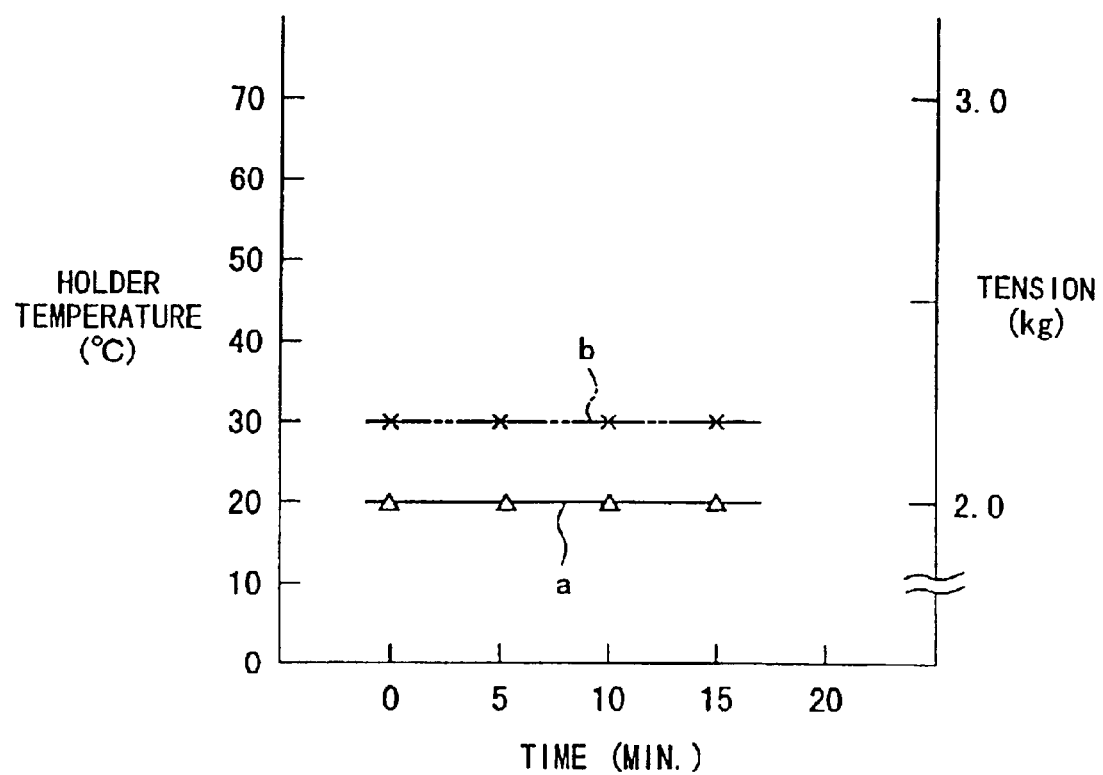
FIG. 12 is a diagram showing the manner in which tension and holder temperature vary with time at a slipping speed of 50 rpm and a measuring position represented by a diameter of 200 mm in a comparative example.

In the comparative example (no cooling effected), the tension was monitored for variations with time and the temperature of the holder 106 was monitored for variations with time at the web coil diameter of 200 mm. The slipping speed was fixed to 50 rpm. The measures results are shown in FIG. 12. In FIG. 12, the curve a (- Δ -) represents variations of the tension, and the curve b (- × -) represents variations of the temperature of the holder 106.

It can be understood from FIG. 12 that when the slipping speed is low, the temperature of the holder 106 and the tension are substantially constant even if the winding device is not cooled.

However, when the slipping speed increased, if the winding device was not cooled, then the temperature of the holder 106 increased with time, and the tension decreased accordingly.

Figure 13:
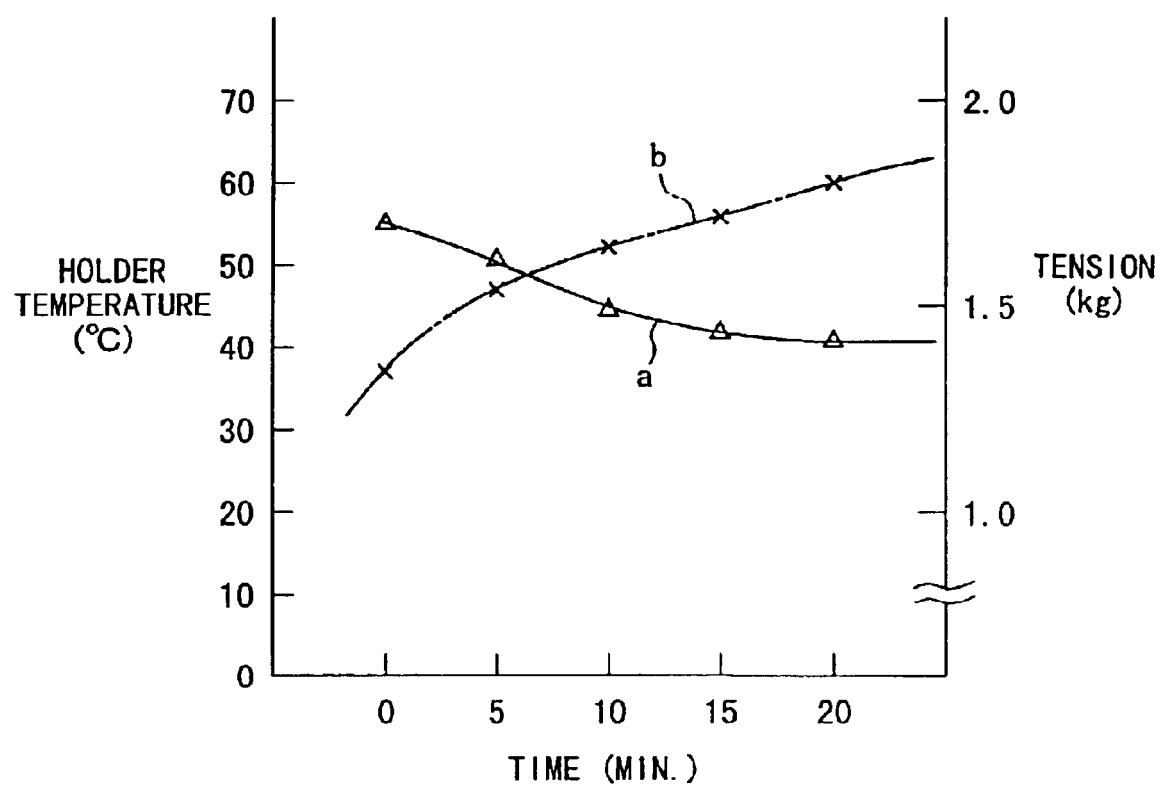
FIG. 13 is a diagram showing the manner in which tension and holder temperature vary with time at a slipping speed of 200 rpm and a measuring position represented by a diameter of 600 mm in the comparative example.

Specifically, in the comparative example (no cooling effected), the tension was monitored for variations with time and the temperature of the holder 106 was monitored for variations with time at the web coil diameter of 600 mm. The slipping speed was fixed to 200 rpm. The measures results are shown in FIG. 13. In FIG. 13, the curve a (- Δ -) represents variations of the tension, and the curve b (- × -) represents variations of the temperature of the holder 106.

It can be seen from FIG. 13 that the temperature of the holder 106 was initially about 35° C. and the tension was initially 1.7 kg, and upon elapse of 20 minutes, the temperature of the holder 106 increased to about 60° C. and the tension decreased to 1.4 kg.

Figure 14:
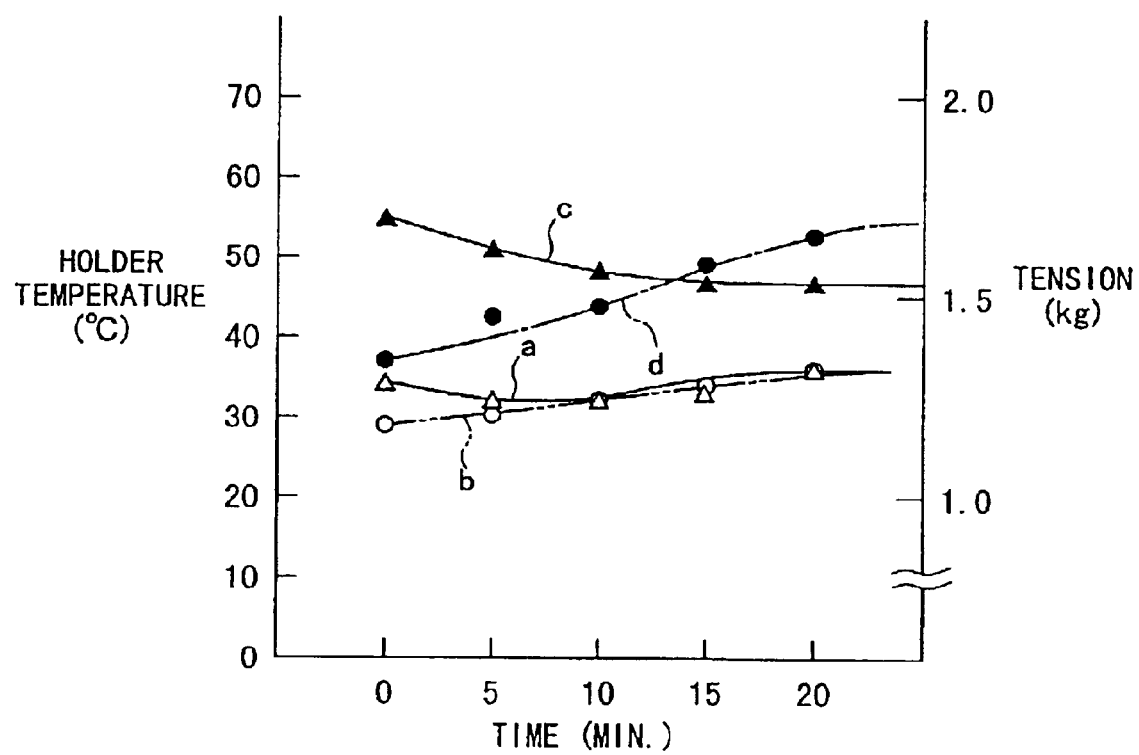
FIG. 14 is a diagram showing the manner in which tension and holder temperature vary with time at slipping speeds of 150 rpm and 200 rpm and a measuring position represented by a diameter of 600 mm in the inventive example.
Figure 15:
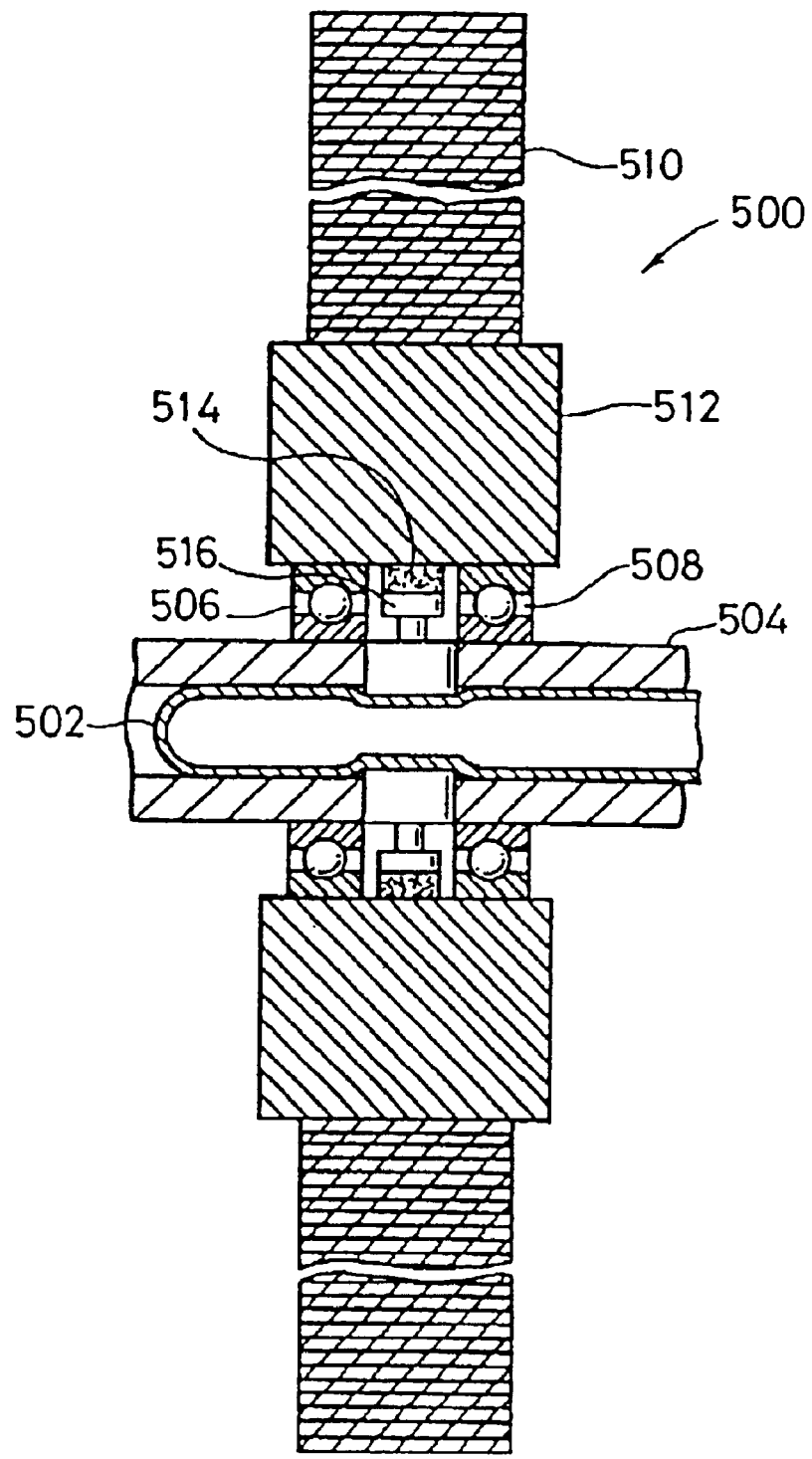
FIG. 15 is a vertical cross-sectional view of a conventional winding device.

In the inventive example (cooling effected), the tension was monitored for variations with time and the temperature of the holder 106 was monitored for variations with time at the web coil diameter of 600 mm. The measures results are shown in FIG. 14. In FIG. 14, the curve a (- Δ -) represents variations of the tension at a slipping speed of 150 rpm, the curve b (- ○ -) represents variations of the temperature of the holder 106 at a slipping speed of 150 rpm, the curve c (- ▲ -) represents variations of the tension at a slipping speed of 200 rpm, and the curve d (- ● -) represents variations of the temperature of the holder 106 at a slipping speed of 200 rpm.

A review of FIG. 14 indicates that at the slipping speed of 150 rpm, the temperature of the holder 106 was initially about 30° C. and the tension was initially 1.4 kg, and upon elapse of 20 minutes, the temperature of the holder 106 increased only to about 37° C. and the tension remained substantially constant.

At the slipping speed of 200 rpm, the temperature of the holder 106 was initially about 37° C. and the tension was initially 1.7 kg, and upon elapse of 20 minutes, the temperature of the holder 106 increased to about 50° C. and the tension dropped to 1.5 kg. These fluctuation ratios of the temperature and the tension are much smaller than those of the comparative example (no cooling effected).

As described above, the winding device according to the present invention is capable of winding wide webs having a large thickness ranging from 100 to 150 μm, e.g., photographic photosensitive webs (films), with a low tension fluctuation ratio of ±5% or less, while producing large tension easily and stably. The maintenance of the winding device according to the present invention is facilitated.

Although certain preferred embodiments of the present invention have been shown and described in detail, it should be understood that various changes and modifications may be made therein without departing from the scope of the appended claims.

What is claimed is:

1. A web processing system having at least a web slitting device for slitting a wider web into a plurality of narrower webs, said web slitting device comprising:
   a rotary blade assembly for slitting a wider web which is being fed, along the direction of feed into a plurality of narrower webs; and
   side edge delivery means for delivering side edges produced from said wider web when the wider web is slit into said narrower webs;
   said side edge delivery means comprising:
   a side edge delivery roller rotatable in a direction to deliver the side edges;
   a nip roller rotatable with said side edge delivery roller while gripping the side edges between said side edge delivery roller and said nip roller; and
   a nip roller pressing mechanism for pressing said nip roller against said side edge delivery roller under a predetermined pressure to adjustably control a tension applied to said side edges based on a tension applied to said narrower webs;
   said side edge delivery roller being rotatable at a peripheral speed higher than a peripheral speed of said rotary blade assembly.

2. A web processing system according to claim 1, wherein said nip roller pressing mechanism comprises:
   a cylinder for displacing said nip roller in a direction toward said side edge delivery roller or a direction away from said side edge delivery roller; and
   a regulator for regulating an air pressure supplied to said cylinder to control the pressure under which said nip roller is pressed against said side edge delivery roller.

3. A web processing system according to claim 2, further including a controller, wherein said regulator regulates said air pressure based on a signal from said controller.

4. A web processing system according to claim 1, wherein the peripheral speed of said side edge delivery roller is higher than the peripheral speed of said rotary blade assembly by a value ranging from 0.5% to 5%.

5. A web processing system according to claim 1, further comprising a motor and a pair of speed reducer mechanisms, said rotary blade assembly and said side edge delivery roller being operatively coupled to said motor via said speed reducer mechanisms, respectively.

6. A web processing system according to claim 1, wherein two nip rollers are provided which respectively grip separate ones of said side edges.

7. A web processing system according to claim 1, wherein the tension applied to said side edges by said nip roller pressing mechanism is controlled so as to be substantially equal to a tension applied to said narrower webs.

8. A web processing system having at least a web slitting device for slitting a wider web into a plurality of narrower webs, said web slitting device comprising:

a rotary blade assembly for slitting a wider web which is being fed, along the direction of feed into a plurality of narrower webs; and side edge delivery means for delivering side edges produced from said wider web when the wider web is slit into said narrower webs;

said side edge delivery means comprising:

a side edge delivery roller rotatable in a direction to deliver the side edges;

a nip roller rotatable with said side edge delivery roller while gripping the side edges between said side edge delivery roller and said nip roller; and nip roller pressing means for pressing said nip roller against said side edge delivery roller under a predetermined pressure so as to adjustably control a tension of said side edges based on a tension applied to said narrower webs;

said side edge delivery roller being rotatable at a peripheral speed higher than a peripheral speed of said rotary blade assembly.

9. A web processing system according to claim 8, wherein the tension applied to said side edges by said nip roller pressing means is controlled so as to be substantially equal to a tension applied to said narrower webs.

* * * * *